United States Patent [19]

(12) United States Patent
Kukosa

(10) Patent No.: US 10,334,183 B2
(45) Date of Patent: *Jun. 25, 2019

(54) DISTRIBUTED AUDIO CONTROL METHOD, DEVICE SYSTEM, AND SOFTWARE PRODUCT

(71) Applicant: Unify GmbH & Co. KG, Munich (DE)

(72) Inventor: Tomas Kukosa, Mokra (CZ)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,420

(22) Filed: Oct. 4, 2018

(65) Prior Publication Data

US 2019/0037149 A1  Jan. 31, 2019

Related U.S. Application Data

(63) Continuation of application No. 15/946,968, filed on Apr. 6, 2018, now Pat. No. 10,129,489, which is a
(Continued)

(30) Foreign Application Priority Data

Dec. 19, 2014  (EP) .................................. 14004332

(51) Int. Cl.
*H04N 7/14* (2006.01)
*H04N 5/268* (2006.01)
(Continued)

(52) U.S. Cl.
CPC ......... *H04N 5/268* (2013.01); *H04L 12/1822* (2013.01); *H04M 3/568* (2013.01); *H04N 5/265* (2013.01); *H04R 2227/00* (2013.01)

(58) Field of Classification Search
CPC combination set(s) only.
See application file for complete search history.

(56) References Cited

U.S. PATENT DOCUMENTS

| 8,437,281 B2 | 5/2013 | Walker et al. |
| 2002/0087592 A1* | 7/2002 | Ghani ................ G06Q 10/10 715/239 |
| 2003/0152093 A1 | 8/2003 | Gupta et al. |
| 2006/0212576 A1 | 9/2006 | Barkley et al. |
| 2008/0010347 A1* | 1/2008 | Houghton ......... H04L 29/06027 709/205 |

(Continued)

FOREIGN PATENT DOCUMENTS

| CN | 101627424 A | 1/2010 |
| CN | 102844736 A | 12/2012 |

(Continued)

OTHER PUBLICATIONS

Research IDR: 2014E0041 CZ; "Low-latency distributed audio multipoint processor", NPL Document filed with U.S. Appl. No. 14/960,674 which is now U.S. Pat. No. 9,973,713.

*Primary Examiner* — Duc Nguyen
*Assistant Examiner* — Assad Mohammed
(74) *Attorney, Agent, or Firm* — Buchanan Ingersoll & Rooney PC

(57) ABSTRACT

A multipoint audio processing method for processing audio streams originating from a plurality of audio clients is executed in a multipoint audio processing node. The method includes the steps of receiving control information on how to preselect audio streams from received audio streams, receiving audio streams from audio clients connected to the distributed multipoint audio processing node and generating evaluated audio streams by analyzing packets of the received audio streams in terms of at least one audio communication characteristic, and attaching an analysis result information of said analysis to said packets, in each audio stream. Audio streams are selected by deciding on whether or not any evaluated audio stream is to be transmitted further, based on the received control information (Continued)

and/or the analysis result information contained in said evaluated audio streams. Then selected audio streams are transmitted further while discarding evaluated audio streams decided not to be to be transmitted further, without mixing any transmitted audio streams. Corresponding steps may be executed by a central audio processing node. A system of audio clients distributed nodes and a central node and a software product are also disclosed.

19 Claims, 2 Drawing Sheets

Related U.S. Application Data continuation of application No. 14/960,674, filed on Dec. 7, 2015, now Pat. No. 9,973,713.

(51) Int. Cl.
*H04L 12/18* (2006.01)
*H04M 3/56* (2006.01)
*H04N 5/265* (2006.01)

(56) References Cited

U.S. PATENT DOCUMENTS

| | | | |
|---|---|---|---|
| 2009/0220064 A1* | 9/2009 | Gorti | H04M 3/56 379/202.01 |
| 2011/0018960 A1* | 1/2011 | Eshkoli | H04L 12/1822 348/14.09 |
| 2013/0100352 A1 | 4/2013 | McGowan et al. | |
| 2013/0342639 A1 | 12/2013 | Bodilis et al. | |
| 2014/0176666 A1 | 6/2014 | Chamberlin et al. | |
| 2015/0079959 A1* | 3/2015 | Daudelin | H04M 3/56 455/416 |
| 2015/0244869 A1 | 8/2015 | Cartwright et al. | |
| 2015/0280970 A1 | 10/2015 | Heda et al. | |

FOREIGN PATENT DOCUMENTS

| | | |
|---|---|---|
| EP | 2285106 A2 | 2/2011 |
| WO | 2012120240 A1 | 9/2012 |

\* cited by examiner

Prior Art

DISTRIBUTED AUDIO CONTROL METHOD, DEVICE SYSTEM, AND SOFTWARE PRODUCT

CROSS-REFERENCE TO RELATED APPLICATIONS

This application is a continuation application of U.S. patent application Ser. No. 15/946,968, which is a continuation of U.S. patent application Ser. No. 14/960,674, which claims priority to European Patent Application No. EP 14004332.4, filed on Dec. 19, 2014.

FIELD OF INVENTION

The present invention relates to a method, device, and system for distributed audio control. The invention also relates to a corresponding software product. The invention is in particular applicable for use in a conferencing application.

BACKGROUND OF THE INVENTION

It is known for conferencing applications that one or more multipoint control units (MCUs) are used to control audio from a plurality of audio sources. In general, each audio source is represented by a client. A plurality of clients are connected to one MCU. A plurality of MCUs may be interconnected, as a mesh or tree, or in a hybrid mesh/tree structure. If large voice conferences are being established, requirements to the MCU grow with a number N of attached clients. Especially performance and bandwidth requirements for multipoint processor (MP) processing voice itself grow with each additional client. If more MCUs are interconnected, some kind of scalability can be attained. However, each MCU introduces payload delay which cannot be decreased under a few tens of milliseconds. Thus, scalability is limited.

To be more specific, FIG. 2 shows an example embodied in the prior art where a multipoint control unit (MCU) 10 controls a plurality of clients 30 (client 1 ... client N). Here, a number of N clients 30 is assumed. (N is referred to as a number of clients to be controlled, as a whole.) In this configuration, as mentioned above, MCU performance is a bottleneck as well as MCU network connection.

FIG. 3 shows another example embodied in the prior art where multiple MCUs 10 each controlling a plurality of clients 30 are interconnected in the form of a full mesh. In this configuration, a good voice delay can be attained as voice delay is limited to 2×MCU_delay. It will be noted that the number of MCU interconnections grows fast, following the relation $m^*=(M\times(M-1))/2$ where $m^*$ is the number of MCU-MCU interconnections among all MCUs in the mesh and M is the number of MCUs in the mesh. With, then, $m^{}$ representing the maximum number of possible MCU-MCU and MCU-Client connections, a maximum number Nmax of clients N is limited to about $Nmax=((m^{}+1)^2)/4$.

FIG. 4 shows another example embodied in the prior art where multiple MCUs 10 each controlling a plurality of clients 30 are interconnected in the form of a 2-levels tree structure. In this configuration, voice delay grows with the number of levels and is, in this example, (3×MCU_delay) which may be on an edge of acceptance or may be unacceptable on less quality networks. With $m^{}$ representing the maximum number of MCU connections again, the number of clients N is limited to about $Nmax=m^{}\times(m^{**}-1)$.

The MCU configurations described above do not scale well because each MCU contains a jitter buffer and a mixing unit introducing significant delay which cannot be reduced. All mixing algorithms do not use really all input streams but select just some of them and only those selected streams are mixed.

From WO2012120240 or US2013342639 it is known to distribute mixing of (video) audio streams. There are one main and one or more secondary media servers. Clients are connected to these servers. The main media server comprises a selection module to select a plurality of incoming streams and a global mixing unit to create an aggregated stream comprising the selected streams. A secondary server comprises a local mixing unit to mix input streams, which are selected by the main server's selection module. As a result, two planes of mixing units are provided.

According to EP2285106 which is similar to US2013342639, the distributed mixing units are controlled by a common application server. As above, distributed mixing is provided.

U.S. Pat. No. 8,437,281 discloses that the mixing process is distributed across nodes in a network and may even take place in an end node (aka terminal). It is provided that payload (or session) paths between the various nodes are free of loops, because a tree hierarchy with one root node and a number of leaf nodes is established. Tree establishment depends on the sequence the nodes enter the conference.

SUMMARY OF THE INVENTION

An object of the present invention is to provide a method, device, and system for distributed audio control which are able to at least partly alleviate the drawbacks of the prior art as mentioned above. In particular, an object of the present invention is to provide such a method, device, and system for distributed audio control which are able to enhance scalability of MCU structure.

The aforementioned object or objects of the invention is/are solved at least in parts by the features of the independent claims. Advantageous embodiments and further developments of the invention are set forth in the sub-claims.

The basic idea of the present invention is that stream evaluation and selection may be distributed and a central mixing node receives just preselected streams for final mixing. Only the central node needs a jitter buffer to reconstruct the stream from received packets. An important tool for realizing this basic idea is to provide a control information as to how to preselect input streams, and a hierarchical structure forwarding such control information from top to bottom. This allows a structured, top-to-bottom control such that analysis of data packets and preselection may be done at most possible inferior level by distributed processing resources, still ensuring that needs of superior entities are met. This ensures that only the needed audio streams are forwarded to the superior entities by shifting competence of selection to the inferior entities while still keeping full control by the superior entities.

Therefore, a first aspect of the invention is a multipoint audio processing method for processing audio streams originating from a plurality of audio clients, said method comprising the following steps, to be executed in a distributed multipoint audio processing node:

receiving control information on how to preselect audio streams for upstream mixing from received audio streams;

receiving audio streams from audio clients connected so said distributed multipoint audio processing node;

generating evaluated audio streams by analyzing packets of said audio streams received from said audio clients in terms of at least one audio communication characteristic, and attaching an analysis result information of said analysis to said packets, in each audio stream;

preselecting audio streams by deciding on whether or not any evaluated audio stream is to be transmitted upstream for mixing, based on said received control information and/or said analysis result information contained in said evaluated audio streams; and transmitting said audio streams decided to be transmitted upstream while discarding evaluated audio streams decided not to be to be transmitted upstream.

Preselection does not need not to be limited to the whole of an audio stream. Also part of a received audio stream may be preselected, e.g., by frame rate, data density, etc., to be transmitted, the rest to be discarded. It is to be noted that the audio streams are not mixed at this point, i.e., in the distributed multipoint audio processing node.

The method of this aspect may further comprise the steps, to be executed in said distributed multipoint audio processing node:

sending said control information to one or more other distributed multipoint audio processing nodes connected to said distributed multipoint audio processing node;

receiving audio streams from said other distributed multipoint audio processing nodes; and transmitting said audio streams received from said other distributed multipoint audio processing nodes upstream for mixing, preferably applying said deciding step on them beforehand while relying on analysis result information already contained in said audio streams received from said other distributed multipoint audio processing nodes.

In other words, audio streams received from said other distributed multipoint audio processing nodes need not to be made subject to a further evaluation step in the distributed multipoint audio processing node receiving them. However, they may or may not be made subject of a further preselection step by applying said deciding step to them so that, just as any stream directly received by a connected audio client, any audio stream received from another distributed multipoint audio processing node is preselected by deciding on whether or not it is to be transmitted upstream for mixing, based on said control information received (from upstream) and/or said analysis result information contained in it (i.e., the audio stream received from downstream); and transmitted upstream only if it is decided to be transmitted upstream, while being discarded if it is decided not to be to be transmitted upstream.

Another aspect of the present invention is a multipoint audio processing method for processing audio streams originating from a plurality of audio clients, said method comprising the steps, to be executed in a central audio processing node:

sending a control information on how to preselect input audio streams downstream to one or more distributed multipoint audio processing nodes connected to said central audio processing node;

receiving audio streams from said distributed multipoint audio processing nodes; and generating a mixed audio stream from said received audio streams, preferably with employing a jitter buffer, and preferably deciding beforehand, based on said control information and/or any analysis result information contained in said received audio streams, on whether or not a received audio stream is to be used for mixing.

The method of this aspect may be combined with the method steps of the previous aspect but also realize the inventive idea per se. It is central here that the control information is distributed from top to bottom, starting from the central audio processing node.

The mixing is only done at the central node. There is no evaluation of streams received in the central node. Instead, the method relies on the assumption that any audio stream has already been evaluated and preselected at inferior nodes. A delay stemming from jitter buffer of mixing will not sum up through a plurality of mixing stages but will appear only once. Processing load will be distributed by evaluating and preselecting at lower instances.

The method of this and/or the previous aspect may further comprise the steps:

defining said control information, to be executed in said central audio processing node; and/or generating an extracted control information to be used for preselection, to be executed in said central audio processing node or said distributed audio processing node; and/or generating a modified control information for sending to another connected distributed audio processing node, to be executed in said central audio processing node or said distributed audio processing node.

In the first option, the control information is defined by the central node. Alternatively, the control information may be fixedly predefined. Definition may be done by algorithm and/or user input. In the second option, each stage may take from the control information what it needs. E.g., a control information part needed only at the lowest level distributed nodes where the audio clients are connected to may be discarded at other distributed nodes. Other control information parts may be needed only at forwarding distributed nodes (intermediate nodes) receiving an already preselected stream. The central node may also make use of some part of the control information, in managing and/or preselecting incoming audio streams. In the third option, a stage may add its own needs to the control information sent to an inferior node. The control information forwarded downwardly may be influenced by characteristics, resources, load etc. of the inferior node or the established communication line.

The control information as to how to preselect input audio streams may include at least one of an algorithm, parameters, and number of required streams. The characteristic parameter may be a volume parameter, and/or may be adapted to said control information.

Another aspect of the present invention relates to a multipoint audio processing device for processing audio streams originating from a plurality of audio clients. The device of this aspect is adapted to execute a method according to any of the preceding aspects, and may in particular be a server, preferably conference server, client, desktop computer, portable computer, tablet, telephone, mobile phone, smart phone, PDA, or the like.

Another aspect of the present invention is a multipoint audio processing system for processing a plurality of audio streams, including a first processing node having a mixing unit and a multiplexing unit;

one or more second processing nodes each having an evaluation unit and a multiplexing unit; and a plurality of audio clients, wherein said first processing node, second processing nodes, and audio clients form a hierarchical communication network structure where said first processing node is communicatively connected or connectable, in a downward hierarchical direction, with one or more inferior nodes selected or selectable from said second processing nodes;

each of said second processing nodes is communicatively connected or connectable, in a downward hierarchical direction, with one or more of said audio clients such that each of said audio clients is connected with a dedicated one of said second processing nodes;

each of said second processing nodes is furthermore communicatively connected or connectable, in a downward hierarchical direction, with one or more inferior nodes selected or selectable from others of said second processing nodes; and each of said second processing nodes is communicatively connected or connectable, in an upward hierarchical direction, with a superior node selected or selectable from said first processing node and the others of said second processing nodes except said inferior node or nodes, wherein said first processing node's mixing unit is adapted to receive audio streams from it's multiplexing unit, and to generate a mixed audio stream from said received audio streams;

said first processing node's multiplexing unit is adapted to send control information on how to preselect input audio streams to it's respective inferior nodes, to receive audio streams from any respective inferior nodes, and to forward said received audio streams to it's mixing unit;

each of said second processing nodes' evaluation unit is adapted to receive audio streams from each audio client connected hereto, to analyze packets of said received audio streams in terms of at least one audio communication characteristic, to attach analysis result information of said analysis to said packets, and to provide an evaluated audio stream containing said packets including said analysis result information to it's multiplexing unit;

each of said second processing nodes' multiplexing unit is adapted to receive said control information from its superior node, to receive audio streams from it's respective evaluation unit and/or from any respective inferior node, to preselect audio streams received from it's respective evaluation unit and/or inferior nodes based on said control information and/or analysis result information contained in such stream, to send said preselected audio streams to it's superior node, and to send said control information to any respective inferior nodes.

Obviously, the one first node is a central node while the second nodes are distributed nodes, in the sense of previous aspects of the invention, respectively.

The system may be embodied such that said first processing node's mixing unit is adapted to define said control information, and providing said control information to it's multiplexing unit. Alternatively, the system may be embodied such that said first processing node's multiplexing unit is adapted to define said control information. In both cases, the first processing node's multiplexing unit may be adapted to use said control information for performing a final preselection step on any received audio streams, based on said control information and/or analysis result information contained in each stream, before transmitting the preselected streams to the mixing unit, and to distribute said control information to downstream nodes (i.e., respective multiplexing units thereof).

The system may be embodied such that said first processing node's multiplexing unit is adapted to preselect audio streams from said received audio streams based on said control information. In other words, the multiplexing unit in the central node and multiplexing units in distributed nodes may be exactly the same. The multiplexing unit itself does not need to know where in the mesh it is located.

The system may be embodied such that said multiplexing units are adapted to generate an extracted control information from control information received from a superior node or from it's own mixing unit as far as the first processing node is concerned, and to use said extracted control information for preselection, and/or to generate a modified control information, based on control information received from a superior node or from it's own mixing unit as far as the first processing node is concerned, and to send said modified control information to their inferior nodes, if any, to be received and used there for preselection.

The system may be embodied such that said first processing node's mixing unit includes a jitter buffer.

The system may be embodied such that said control information as to how to preselect input audio streams includes at least one of an algorithm, parameters, and number of required streams, and/or said characteristic parameter is a volume parameter, and/or is adapted to said control information.

Another aspect of the invention is a software product for processing audio streams originating from a plurality of audio clients, said software product being stored on computer-readable medium, preferably being directly loadable into an internal memory of a computer, and including program code for performing the steps of any of the afore-described methods when said software product is executed by said computer, said computer preferably including or being embodied by or included in a server, preferably conference server, client, desktop computer, portable computer, tablet, telephone, mobile phone, smart phone, PDA, or the like.

The present invention may as well be embodied by a computer program including instructions causing a computer to perform the steps of the afore-described method when said computer program is loaded in or executed by said computer, or by a digital data carrier having electrically readable control signals which are designed to operate with a programmable computer, said control signals being designed and adapted to cause the computer to perform the steps of the afore-described method.

In any such cases, the computer may also be embodied by the device of the described aspect of the invention, a communication device such as a mobile phone, smart phone or the like, a server such as a conference server or the like, a personal computer or the like. The software product may be a plug-in, add-on, app or the like to be included in or used by or co-executed with a conferencing application or the like, or may constitute a basic program of a conferencing unit, server, or the like.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

Next, the invention is described referring to specific embodiments and referring to the accompanying drawings.

It is to be noted that the drawings are purely schematic and not necessarily to scale. The drawings and descriptions are to illustrate the principle underlying the invention, rather than to limit the invention in any way. The present invention is only limited by the appended claims. Elements shown in a single unit may be practically distributed and/or included in different units, and elements shown in different units may be practically included in one or more other units, unless explicitly described otherwise or clearly impracticable.

DESCRIPTION OF THE PREFERRED EMBODIMENTS

As mentioned above, a general idea of this application is to provide a method that solves the problems mentioned above by distributing stream evaluation and selection and providing a central mixing node receiving just preselected streams for final mixing.

Figure 1:
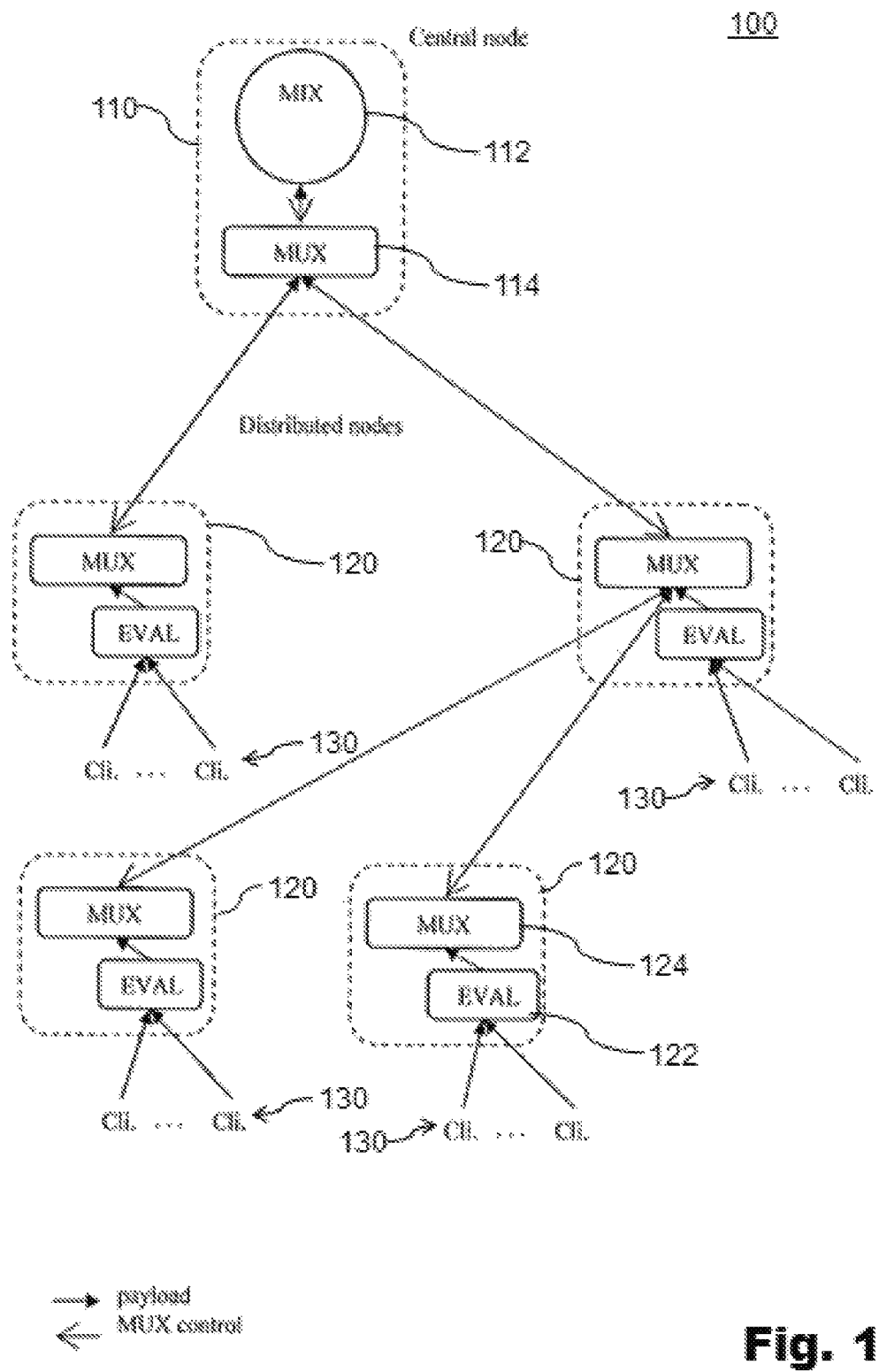
FIG. 1 is a diagram that shows an exemplary embodiment of the present invention.
Figure 2:
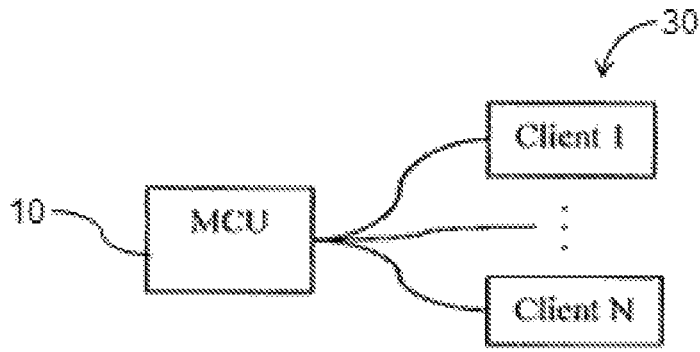
FIG. 2 is a diagram that shows an exemplary configuration in the prior art.
Figure 3:
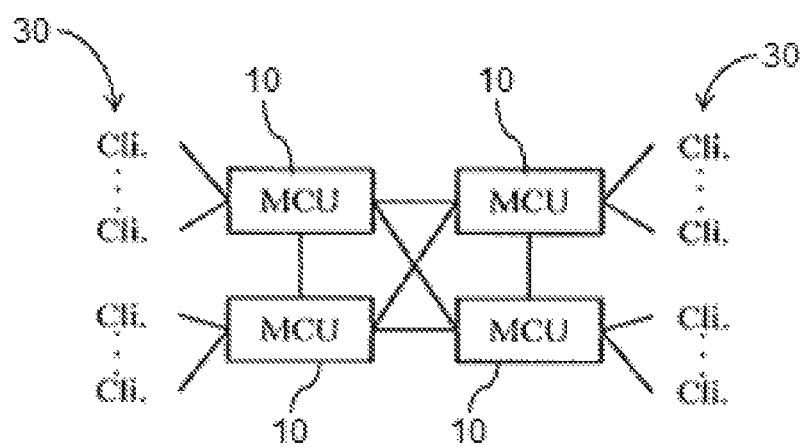
FIG. 3 is a diagram that shows another exemplary configuration in the prior art.
Figure 4:
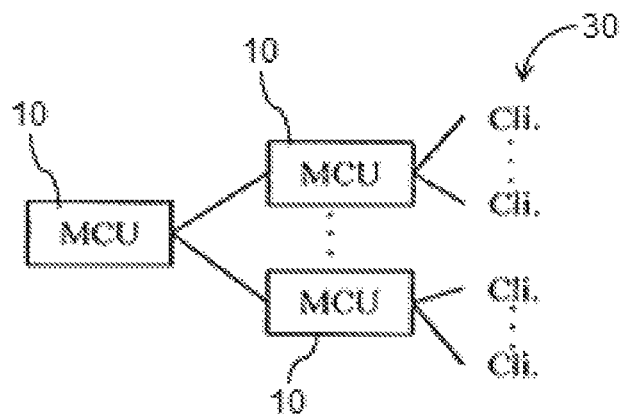
FIG. 4 is a diagram that shows yet another exemplary configuration in the prior art.

The implementing concept of the present invention is described in the context of a configuration shown in FIG. 1. FIG. 1 shows a configuration of a central mixing node 110 (also referred to as central node 110) interconnected with a plurality of distributed nodes 120 in a partly cascaded network 100. Some of the distributed nodes 120 are connected directly with central mixing node 110 while other distributed nodes 120 are connected with another distributed node 120. However, any distributed node 120 has a communication path with central mixing node 110, directly or via other distributed node(s) 120. Clients 130 are connected with a dedicated distributed node 120, respectively.

Upstream central mixing node 110 comprises a conference mixer (MIX) 112 and a multiplexer (MUX) 114. The conference mixer 112 is the only instance containing a jitter buffer, and mixes output streams from preselected input streams. It controls multiplexer 114 how to preselect input streams with sending to it a selection algorithm, parameters, number of required streams, etc. The multiplexer 114 does preselection of streams from connected distributed nodes 120 and controls immediately connected distributed nodes determining how they preselect input streams forwarding to them said selection algorithm, parameters, number of required streams, etc. (see below for details).

Any downstream distributed node 120 comprises a packet evaluator (EVAL) 122 and a multiplexer (MUX) 124. The multiplexer 124 is controlled by a superior multiplexer which may be a multiplexer 124 of a distributed node 120 higher in hierarchy or multiplexer 114 of central node 110. Packet evaluator 122 analyzes packets in respect of volume and other characteristics if necessary, and attaches result values to each packet. Packet evaluator 122 does not reconstruct whole stream but just analyzes each packet as soon as it is received. Multiplexer 124 receives from its superior information how to preselect streams (algorithm, parameters, number of required streams etc.) received from its inferior multiplexers 124 and it's own packet evaluator 122 (inferior means belonging to a distributed node 120 lower in hierarchy). Preselected streams are sent to the superior multiplexer 124. Multiplexer 124 also controls its own inferior multiplexers 124 to get only appropriate streams from them. It does not analyze packets of incoming streams because all packets have been already evaluated, and evaluation result necessary for selection is attached to each packet, by inferior packet evaluator 122.

In the downstream payload direction, mixed payload is distributed from central node 110 through distributed nodes to all clients. There is no additional processing or other reasons for delay. Downstream direction does not contain any specific solution relevant to this invention.

In summary, the proposed conference system architecture provides low latency and limited use of network resources. A central node comprises the mixing unit, a jitter buffer and a multiplexer. Distributed nodes comprise a multiplexer and an evaluation unit. All clients are connected to these nodes. The evaluation unit evaluates the audio streams coming in from the connected clients with respect to volume and/l or other characteristics, attaches the result to the packets and forwards them to the multiplexer. The multiplexer is controlled by its superior multiplexer, which may reside in another distributed node or the central node, or by the conference mixer in the case of the central node itself. Control data define how to (pre-)select streams to be forwarded to the multiplexer of the superior node or to the conference mixer in the case of the central node. Intermediate nodes do not evaluate the streams again, but accept and forward them as they are until they finally arrive at the central node. Based on the evaluation results attached to the packets, the central node sends control data to its slave node (distributed node) to control their multiplexer. If such a slave node is an intermediate node, this node in turn forwards control data to its slave nodes to control their multiplexer. In other words, streams are evaluated just once (i.e., at a lowest level). This, of course, does not exclude that they still could be discarded by preselection algorithm at any higher level. For example, a stream loud enough in context of one distributed (leaf) node may not be loud enough in context of some higher-level node preselecting from more other streams. In this way, stream evaluation and selection is done by a hierarchy of distributed nodes, while stream mixing is still performed by a central node. The configuration requires just one jitter buffer and a single mixing unit.

In this structure described above, conference mixer 112 directly controls only the immediately subordinate multiplexer 114. All other multiplexers 124 are controlled by immediately superior multiplexers. Thereby, it is not necessary to have a central node controlling directly all multiplexers. (However, it is possible that central node 110 controls all multiplexers if all distributed nodes are directly connected to it which would be a special case of the structure, or an option.) The idea is to have the system better scalable if each node processes only a limited number of incoming streams to a limited number of outgoing streams without any knowledge what is behind immediate neighbours and how large the whole system is.

As a result, the present invention introduces better scalability because distributed nodes 120 do not introduce fixed significant payload delay. Distributed nodes 120 process each incoming packet as soon as it is received, and forward it to a superior node if necessary. The only node where significant payload delay is introduced is the central node 110 containing a jitter buffer for stream reconstruction and following delay caused by mixing.

It will be noted that central node 110 represents a first processing node or a central audio processing node, and distributed nodes 120 represent second processing nodes or distributed audio processing nodes, in the sense of the present invention. Likewise, conference mixer 112 represents a mixing unit, multiplexers 114, 124 represent multiplexing units, and packet evaluators 122 represent evaluation units in the sense of the present invention. Any one of central node 110 and distributed nodes 120 may be referred to as a multipoint audio processing node in the sense of the present invention. Each of them may represent or be included in a multipoint audio processing device. Network 100 represents a multipoint audio processing system in the sense of the present invention and may be embodied in a string configuration, a star configuration or a combination thereof, or any conceivable hierarchical configuration.

The multipoint audio processing system was exemplified in the form of a tree-structure which represents a hierarchical communication network structure in the sense of the present invention. However, the present invention is likewise applicable in a mesh structure. That is, each distributed node may be connected to a plurality of superior nodes, leaving actual routing to system self-optimization. Even each audio client may, in principle, be connected to a plurality of distributed nodes, even through different networks (wired, WLAN, cellular, Bluetooth, etc.). It is important, however, that any audio client is connected, through a path via one or several distributed nodes, with the central node and that each distributed node is controlled from top to bottom such that the lowest possible level does actual analyzing and a first round of preselecting, enabling that the processing load is distributed to the most possible extent. Throughout the application, "upstream" denotes a direction from an origin or source of an audio stream, i.e., a client, to a central entity where mixing is done, and "downstream" denotes a direction from said central entity to a (or a plurality) of sources, i.e., clients. In other words, downstream is from where an individual stream is received, and upstream is to where an individual stream is transmitted. In terms of a mixed stream routed to each client via the same nodes, it will be noted that the mixed stream is received from upstream and transmitted to downstream.

In the network 100 exemplified above, any multiplexer 114, 124 was described to just forward control information as to how to preselect received streams. In a further development, any multiplexer 114, 124 may be able to refine, extract or even overrule said control information so as to adapt it to its own requirements, and the highest-level multiplexer 114 may be able to originally define said control information, instead of the conference mixer 112.

Obviously, various applications of the present invention may become apparent to person skilled in the art, based on the information disclosed in the present specification, which might not be mentioned explicitly but are fully covered by the scope of the present application.

Specific features of the invention as described above with reference to the exemplary embodiments may also be implemented in other embodiments, variations or modifications, unless such implementations impose their own prohibitions.

A technical feature or several technical features which has/have been disclosed with respect to a single or several embodiments disclosed herein before, e.g. the network 100 being formed in a string configuration, may be present also in another embodiment, e.g. the network 100 being formed in a star configuration, except it is/they are specified not to be present or it is impossible for it/them to be present for technical reasons.

What is claimed is:

1. A multipoint audio processing method for processing audio streams originating from a plurality of audio clients, said method comprising:
   second processing nodes receiving control information from a first processing node, the control information identifying how to preselect audio streams for transmitting upstream toward the first processing node for upstream mixing, each of the second processing node comprising a processor and a non-transitory computer readable medium;
   each of the second processing nodes generating evaluated audio streams by analyzing packets of audio streams received by the second processing node in terms of at least one audio communication characteristic and including analysis result information of said analysis with said packets in each audio stream;
   each of the second processing nodes preselecting audio streams by deciding on whether or not any evaluated audio stream is to be transmitted upstream for mixing based on said received control information and said analysis result information;
   each of the second processing nodes transmitting said audio streams decided to be transmitted upstream toward the first processing node while discarding evaluated audio streams decided not to be transmitted upstream based on the control information and the analysis result information.

2. The method of claim 1, comprising:
   the first processing node receiving audio streams from the second processing nodes and generating a mixed audio stream from said received audio streams for transmission to audio clients.

3. The method of claim 1, comprising:
   the second processing nodes sending the control information on how to preselect audio streams for upstream mixing from received audio streams to third processing nodes;
   each of the third processing nodes receiving audio streams from audio clients connected to the third processing node;
   each of the third processing nodes generating evaluated audio streams by analyzing packets of said audio streams received from said audio clients connected to the third processing node in terms of at least one audio communication characteristic and attaching an analysis result information of said analysis to said packets in each audio stream;
   each of the third processing nodes preselecting audio streams by deciding on whether or not any evaluated audio stream is to be transmitted upstream for mixing, based on said control information received from the second processing node to which the third processing node is connected and said analysis result information contained in said evaluated audio streams of the audio streams received from the audio clients connected to the third processing node; and
   each of the third processing nodes transmitting said audio streams received from the audio clients connected to the third processing node decided to be transmitted upstream while discarding evaluated audio streams received from the audio clients connected to the third processing node decided not to be transmitted upstream based on the control information received from the second processing node to which the third processing node is communicatively connected and the analysis result information from the analyzing of the said audio streams received from said audio clients connected to the third processing node.

4. The method of claim 3, comprising:
the first processing node receiving audio streams from the third processing nodes via the second processing nodes for generating the mixed audio stream for transmission to the audio clients.

5. The method of claim 3, comprising:
each of the second processing nodes relying on analysis result information already contained in audio streams received from at least one of the third processing nodes to which the second processing node is communicatively connected for preselecting the audio streams received from the at least one third processing node to which the second processing node is connected for transmitting upstream to the first processing node.

6. The method of claim 1, wherein said control information identifies how to preselect input audio streams includes at least one of an algorithm, parameters, and number of required streams.

7. The method of claim 6, wherein the at least one audio communication characteristic parameter is adapted to said control information.

8. A multipoint audio processing method for processing audio streams originating from a plurality of audio clients, said method comprising:
a first processing node determining control information identifying how to preselect audio streams for transmitting upstream toward the first processing node and transmitting that control information downstream to second processing nodes, the first processing node comprising a processor and a non-transitory computer readable medium;
the first processing node transmitting the control information to the second processing nodes to facilitate the second processing nodes generating evaluated audio streams by analyzing packets of audio streams in terms of at least one audio communication characteristic and including an analysis result information of said analysis with said packets in each audio stream, preselecting audio streams by deciding on whether or not any evaluated audio stream is to be transmitted upstream for mixing based on said received control information and transmitting said audio streams decided to be transmitted upstream toward the first processing node.

9. The method of claim 8, comprising:
the second processing nodes receiving the control information from the first processing node.

10. The method of claim 8, comprising:
the first processing node receiving audio streams from the second processing nodes and generating a mixed audio stream from said received audio streams for transmission to the audio clients.

11. The method of claim 8, wherein said control information identifies how to preselect input audio streams includes at least one of an algorithm, parameters, and number of required streams.

12. The method of claim 11, wherein the at least one audio communication characteristic comprises at least one parameter adapted to said control information.

13. The method of claim 8, comprising:
the second processing nodes receiving control information from the first processing node;
each of the second processing nodes receiving audio streams from audio clients connected to the second processing node;
each of the second processing nodes generating evaluated audio streams by analyzing packets of said audio streams received from said audio clients in terms of at least one audio communication characteristic;
each of the second processing nodes preselecting audio streams by deciding on whether or not any evaluated audio stream is to be transmitted upstream for mixing based on said received control information and said analysis result information contained in said evaluated audio streams;
each of the second processing nodes transmitting said audio streams decided to be transmitted upstream toward the first processing node while discarding evaluated audio streams decided not to be transmitted upstream based on the control information.

14. The method of claim 13, comprising:
the second processing nodes sending the control information to third processing nodes; each of the third processing nodes receiving audio streams from audio clients connected to the third processing node;
each of the third processing nodes generating evaluated audio streams by analyzing packets of said audio streams received from said audio clients connected to the third processing node in terms of at least one audio communication characteristic;
each of the third processing nodes preselecting audio streams by deciding on whether or not any evaluated audio stream is to be transmitted upstream for mixing, based on said control information received from the second processing node to which the third processing node is connected; and
each of the third processing nodes transmitting said audio streams received from the audio clients connected to the third processing node decided to be transmitted upstream while discarding evaluated audio streams received from the audio clients connected to the third processing node decided not to be transmitted upstream based on the control information received from the second processing node to which the third processing node is communicatively connected and the analysis result information from the analyzing of the said audio streams received from said audio clients connected to the third processing node.

15. The method of claim 8, comprising:
the second processing nodes receiving control information from the first processing node;
the second processing nodes sending the control information to third processing nodes;
each of the third processing nodes receiving audio streams from audio clients connected to the third processing node;
each of the third processing nodes generating evaluated audio streams by analyzing packets of said audio streams received from said audio clients connected to the third processing node in terms of at least one audio communication characteristic and attaching an analysis result information of said analysis to said packets in each audio stream;
each of the third processing nodes preselecting audio streams by deciding on whether or not any evaluated audio stream is to be transmitted upstream for mixing, based on said control information received from the second processing node to which the third processing node is connected and said analysis result information contained in said evaluated audio streams of the audio streams received from the audio clients connected to the third processing node; and each of the third processing nodes transmitting said audio streams received from the audio clients connected to the third processing node decided to be transmitted upstream while discarding evaluated audio streams received from the audio clients connected to the third processing node decided not to be transmitted upstream based on the control information received from the second processing node to which the third processing node is communicatively connected and the analysis result information from the analyzing of the said audio streams received from said audio clients connected to the third processing node.

16. A communication apparatus comprising:

a first processing node having a processor and a non-transitory computer readable medium;

said first processing node configured to generate a mixed audio stream from received audio streams;

said first processing node also configured to send control information on how to preselect input audio streams for transmitting upstream toward the first processing node to respective inferior nodes to which the first processing node is communicatively connectable and is also configured to receive audio streams from any of the respective inferior nodes to generate the mixed audio stream for transmission to audio clients; and the respective inferior nodes, each of the respective inferior nodes configured to receive the audio streams, analyze packets of said received audio streams in terms of at least one audio communication characteristic, to include analysis result information of said analysis with said packets, and to utilize an analyzed audio stream containing said packets including said analysis result information to preselect audio streams received from the audio clients for transmitting toward the first processing node.

17. The communication apparatus of claim 16, wherein the analysis result information is utilized to preselect the received audio streams for transmitting toward the first processing node such that some of the received audio streams are not sent toward the first processing node.

18. The communication apparatus of claim 16, wherein each of the respective inferior nodes is configured to send said control information toward any further inferior nodes to which it is communicatively connected;

and wherein the communication apparatus is a network.

19. The communication apparatus of claim 16, wherein said control information identifies how to preselect input audio streams and includes at least one of an algorithm, parameters, and a number of required streams.

* * * * *